United States Patent
Georgis et al.

(10) Patent No.: US 7,246,210 B2
(45) Date of Patent: Jul. 17, 2007

(54) ARCHIVAL CARTRIDGE MANAGEMENT SYSTEM WITH AUTO-REFRESH

(75) Inventors: Steven P. Georgis, Boulder, CO (US); David M. Perry, Berthoud, CO (US)

(73) Assignee: ProStor Systems, Inc., Boulder, CO (US)

(*) Notice: Subject to any disclaimer, the term of this patent is extended or adjusted under 35 U.S.C. 154(b) by 0 days.

(21) Appl. No.: 11/266,868

(22) Filed: Nov. 3, 2005

(65) Prior Publication Data

US 2006/0101197 A1    May 11, 2006

Related U.S. Application Data

(60) Provisional application No. 60/626,267, filed on Nov. 8, 2004.

(51) Int. Cl.
*G06F 12/00* (2006.01)

(52) U.S. Cl. ........................... 711/161; 711/111

(58) Field of Classification Search ............ 711/111, 711/161
See application file for complete search history.

(56) References Cited

U.S. PATENT DOCUMENTS

| | | | | |
|---|---|---|---|---|
| 6,266,199 B1 * | 7/2001 | Gillis et al. | ............... | 360/31 |
| 6,429,984 B1 * | 8/2002 | Alex | ............... | 360/31 |
| 6,490,111 B1 * | 12/2002 | Sacks | ............... | 360/53 |
| 6,628,466 B2 * | 9/2003 | Alex | ............... | 360/31 |

* cited by examiner

*Primary Examiner*—Jack A. Lane
(74) *Attorney, Agent, or Firm*—Townsend and Townsend and Crew LLP (57) ABSTRACT

An archival cartridge management system for conditioning removable data cartridges and normal archival operations is disclosed. The archival cartridge management system includes a cartridge holder and a controller. The cartridge holder has a connector configured for coupling to a removable data cartridge. The connector is coupled to the controller, which performs archival functions on removable data cartridges. The controller reads from removable data cartridges to determine if at least some data stored on a removable data cartridge should be refreshed. If so, the controller refreshes data stored on the removable data cartridge.

25 Claims, 8 Drawing Sheets

ARCHIVAL CARTRIDGE MANAGEMENT SYSTEM WITH AUTO-REFRESH

This application claims the benefit of and is a non-provisional of U.S. Pat. application Ser. No. 60/626,267, filed on Nov. 8, 2004, which is assigned to the assigner hereof and hereby expressly incorporated by reference in its entirety for all purposes.

BACKGROUND

This disclosure relates in general to data storage and, more specifically, but not by way of limitation, to data cartridges and data systems.

The prior art in archival media are tape cartridges. Tape cartridges need to be periodically rewound in order to re-pack and re-tension the tape. Archive facilities typically have a simple tape rewinder device which loads the tape cartridge and winds it from end-to-end and then unloads it again. These devices have no ability to read or write the data or make any determination about the status of the recorded data.

Some tape cartridges contain an electronic memory chip separate from the tape medium which can be used to store some metadata. Often these memory chips are coupled to a RFID system to enable wirelessly reading of the memory. These memory chip systems have no ability to provide state information relating to the data recorded on the tape. There is no ability to refresh the data recorded on a tape cartridge without first loading the cartridge into a tape drive system, reading the contents of the tape using the software application that created the tape originally, and either copying the contents to a system disk drive or directly to a second tape drive. Refreshing the data on the tape is done back at the data center, thus requiring that the cartridges be transported back to the data center for management and then back again to the storage facility.

One of the technical limitations of electronic or electro-mechanical or solid state media such as hard disk drives (HDDs) or flash memory is their finite life. In the case of the HDD, the storage life of the media is limited by phenomena such as magnetic thermal decay (MTD), which is the physical phenomenon whereby the strength of recorded magnetic bits decrease over time. Another HDD limitation is the ability of motors and bearings to operate after being in an inactive state for a period of months or years. A further limitation is corrosion of the heads and media over time. In the case of flash memory, one limit on archive life is the finite time that the electric charge persists in the memory cells.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 1:
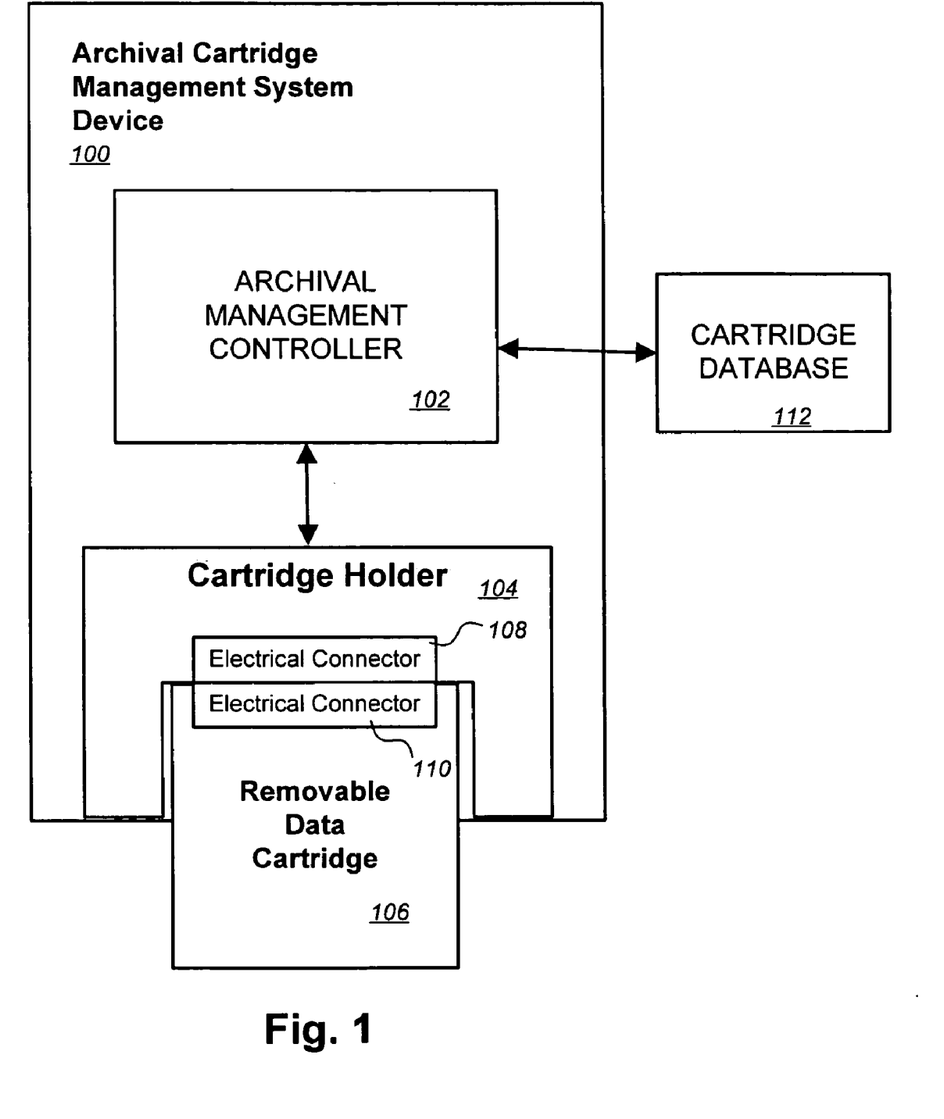
FIG. 1 is a block diagram of an embodiment of an archival cartridge management system (ACMS) device coupled to a removable data cartridge and a cartridge database.
Figure 2:
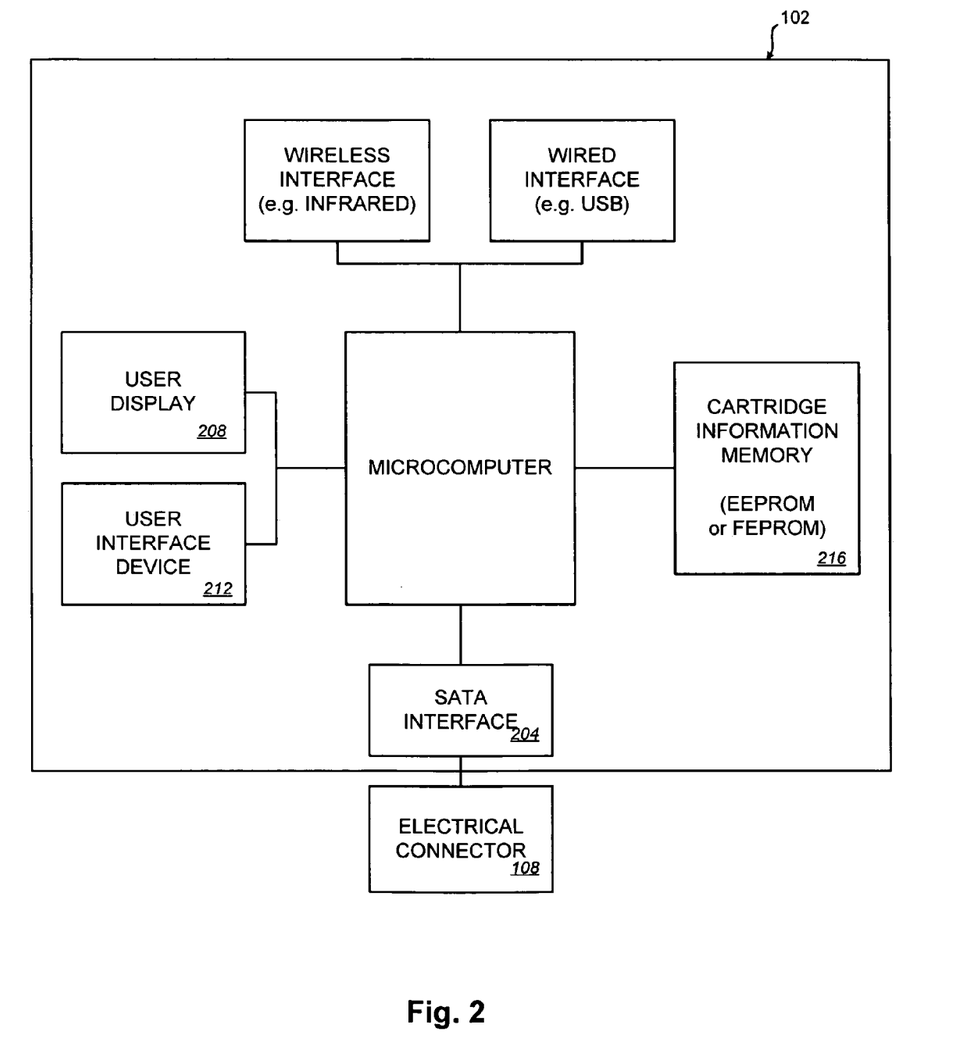
FIG. 2 is a block diagram of an embodiment of an archival management controller coupled to an electric connector.
Figure 3:
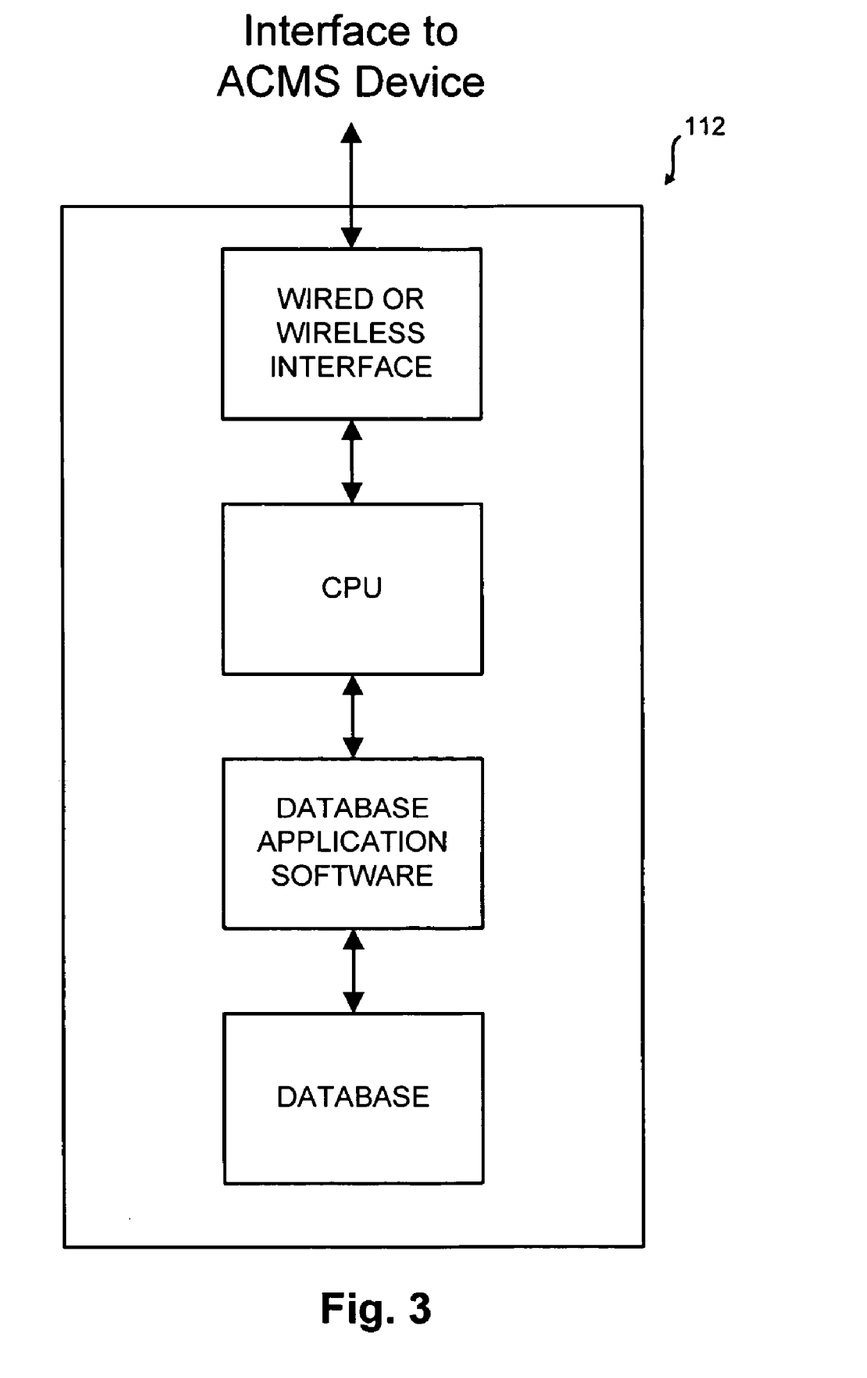
FIG. 3 is a block diagram of an embodiment of a cartridge database.

Referring initially to FIG. 1, an embodiment of this invention is implemented with hardware and/or software to manage removable data cartridges 106 that are used for off-line long-term archival data storage. An archival cartridge management system (ACMS) device 100 is used to manage and condition one or more removable data cartridges 106 using and archival management controller 102, an embodiment of which is illustrated in FIG. 2. In this embodiment an external cartridge database 112 is used to store particulars on the various removable data cartridges 106 that the ACMS device 100 encounters. Other embodiments could integrate the cartridge database 112 into the ADMS device 100. In still another embodiment, the cartridge database 112 is a distributed database such that many ACMS devices can share information. One application is for a removable data cartridge 106 containing a hard disk drive (HDD) as the storage medium, but the system can be used with other types of electronic storage media such as flash memory or removable disks in various other embodiments.

To manage removable data cartridges 106 in an archival application, the ACMS device 100, reads the status of the data cartridge contents and determines the state of the recorded data. Another embodiment of the ACMS device 400 shown in FIG. 4 allows accepting four cartridges 106 in parallel, but other embodiments could accommodate any number of cartridges 106. Such ACMS devices 100, 400 could be either portable (e.g. handheld) or be installed in the archival storage facility where the data cartridges 106 are kept.

The ACMS device 100 contains a docking port or cartridge holder 104 with an electrical connector 108 to receive the data cartridge 106. The cartridge connector 108 mates with another electrical connector 110 of the removable data cartridge 106 to provide electrical power and/or communicate. In the case of a HDD-type removable data cartridge 106, the ACMS device 100 cause the HDD to power-up and spin the disks. This operation will increase the longevity of the motors and bearings by causing them to move, reflow their lubricants and generally avoid stiction or seizing. In one embodiment, the disk spinning operation is done at least once for each insertion and can be done periodically for a HDD left in the cartridge holder.

The ACMS device 100 could read the archival cartridge metadata (ACM) of the removable data cartridge 106 in order to identify the cartridge 106 and gather information related to its contents. Additionally, the ACMS device 100 can read the archival sense field (ASF) to determine the aging state of the stored data. A data refresh operation to re-write the data can be performed by the ACMS device 100 if the ASF indicates that the data has degraded beyond some threshold.

The ACMS device 100 analyzes the removable data cartridge 106. Analysis can include reading the ACM, determining the elapsed time since the last recording, reading the ASF, and/or reading the actual data from the cartridge 106. If the analysis indicates that data on the cartridge 106 is in peril of losing integrity, the data may be re-recorded in the ACMS device 100. The analysis and refresh can happen automatically by the ACMS device 100. For example, should the archival management controller 102 find errors when reading from the HDD, the recovered data after error correction can be re-recorded to the HDD in situ.

Archival Cartridge Metadata (ACM)

The information contained in the ACM generally relates to the physical data cartridge (e.g., serial #, manufacturer, capacity, manufacture date, warranty expiration, etc.), the archival data format (ADF) itself (e.g. revision of ADF, any extensions to ADF, etc.), the HDD contained in the cartridge 106 (e.g., cartridge capacity, manufacture date, manufacturer, warranty expiration, formatting parameters, size, etc.), and the data recorded on the cartridge (e.g., time stamp of when recorded, user, software used for backup, version of the software, computer identifier, encryption standard used, compression standard used, etc.). The table below lists examples of information in an embodiment of the ACM.

| Field | Field Description | # Bytes |
| --- | --- | --- |
| Format Name | "RDX © 2004, ProStor Systems, Inc." | 32 |
| Cart Type | logical format type: type can include RDX serial access, RDX random access, software update, etc. | 1 |
| Format Revision # | "001.1.1" | 7 |
| Cart Capacity | # of Gbytes on media | 2 |
| Media Sector Size | # bytes per addressable sector | 2 |
| Frame Size | # of sectors in Frame structure | 2 |
| Write Access Control | Write enable bits to enable WORM, ROM modes | 1 |
| Cartridge Serial # | Globally-unique 128-bit ID | 16 |
| Volume ID # | application defined - could be bar code # | 8 |
| Volume ID name | application defined | 128 |
| Volume Date/Time Stamp | last recorded date/time | 16 |
| Compression control | Compression control byte | 1 |
| Security Control: Read Access mode | Security ID | 4 |
| Security Control: Data Encryption mode | Data Encryption control | 1 |
| Security Control: Data Encryption Key | Data Encryption public key | 16 |
| Last Media Certified Date | last scanned & certified date/time - also used for media "refresh" operation | 16 |
| Cartridge Status: Volume Open/Closed | indicates whether last write operation finished | 1 |
| Directory First LBA | First Directory LBA # Beginning of Directory | 4 |
| Directory Last LBA | Last Directory LBA # end of Directory | 4 |
| Archival Sense Field Starting LBA | First LBA# of ASF | 4 |
| Encryption Used | Triple DES | 2 |
| End-of-Data LBA | LBA of end-of data Frame | 4 |
| CRC | check bytes | 4 |
| Compression Used | LZW | 1 |

The ACM may be recorded in a special area of the disk which provides higher data reliability than the normal data area in this embodiment. This area of higher reliability helps ensure that the ACM can be read, even if the data area has degraded over time. In one embodiment, the higher data reliability is achieved by the use of data tracks recorded on a wider-than-normal track pitch toward the outer edges of a disk in the HDD. The wider track pitch results in less track misregistration (TMR) by the magnetic head over the track and higher signal-to-noise ratio, combining to ensure a lower bit error rate. In other embodiments, a higher-power write head could be used in the manufacturing process to write this information or it could be written with more robust error correction principals. In one embodiment, the disk could be tested during manufacture to find the best location for the ACM.

One embodiment writes the ACM information to a solid state memory (e.g., flash, magnetic ram, core memory, battery backed memory, etc.). The solid state memory could be in the HDD or outside the HDD and within the removable data cartridge 106. One embodiment uses a RFID tag or smartchip in the removable data cartridge 106 with nonvolatile memory to store the ACM.

Some of the metadata contained in the ACM relates to the physical cartridge and is permanently and uniquely associated with a particular removable data cartridge 106. As such, the ACM should not be inadvertently erased or overwritten by anything other than the ACMS device 100. In order to prevent unauthorized access, the ACM area of the HDD is accessed by means of special commands available only to the ACMS device 100 that maintains the ACM data. These commands may utilize PBAs (physical block addresses) rather than LBAs (logical block addresses) in this embodiment.

The normal computer operating systems (e.g., Windows, UNIX, Linux, etc.) have no visibility into the ACM area of the disk and no ability to erase or write to that area in this embodiment. The ACM normally remains intact even if the disk is reformatted, for example. The ACM is recorded across multiple sectors in a way that permanent data (related to the physical cartridge and embedded HDD) is grouped separately from variable data related to the recorded contents, ensuring no accidental erasure in the event of archival management controller 102 malfunction. The HDD firmware can be updated in some embodiments to allow reserving the ACM and preventing any writes without using the special commands. The ACM data may be recorded multiple times to provide further data integrity.

One of the features of the ACM is a globally-unique serial number that cannot be changed after the removable data cartridge 106 is manufactured. In one embodiment, industry-standard IPv6 addresses are used that enable the cartridges to be uniquely identified on the Internet. One embodiment allows modification of the globally-unique serial number, but only allows certain parties to change the serial number. For example, a key may be required to change the serial number, but could be performed when a cartridge 106 is repaired.

Another of the features of the ACM is the ability to perform write access control. A control byte in the ACM determines whether or not a particular field can be written to and how many times. In many archival data storage applications, the archival media are not allowed to be changed or overwritten after the original recording. This is commonly known as Write-Once Read-Mostly mode or WORM. A variation on WORM allows new data to be appended to the original data, without changing any of the original data. Another variation is Read-Only Mode or ROM where the data cannot be erased or written at all. This is commonly used for distribution of information such as software updates that are not intended to be modified. The inclusion of the write access control field in the ACM makes it possible for the archival management controller 102 to enforce WORM or other operation without the possibility of the WORM status being altered intentionally or unintentionally by a data application. The data application may or may not have the ability to change the value of the write access control field in various embodiments.

Several other features relate to data security on the cartridge. The first is security ID field which stores a password for access to the cartridge data. The second is data encryption mode and/or key fields. The data encryption mode field specifies whether the recorded data is encrypted and by which method. The data encryption key field stores the "public key" for industry-standard data encryption algorithms such as RSA, but other embodiments could use private keying schemes such as AES, triple-DES or DES. The public key is used together with a "private key" known only to the owner of the cartridge to decode the data.

The last media certified date field stores a date/time code for the last time the data cartridge was scanned for errors and certified for data integrity by the archival management controller 102. This feature is also used in conjunction with the ASF described below to trigger any media refresh operation.

Archival Sense Field (ASF)

The ASF can be used to diagnose media aging and data degradation over time in one embodiment. The ASF is recorded as a special data pattern sequence of one or more sectors, such as a large number of sectors, for example, one hundred sectors. The ASF pattern is designed to reflect the degree of magnetic degradation of the recorded data bits on the media when read back. The data pattern in ASF is designed to be "worst-case" from the perspective of magnetic thermal decay (MTD) and corrosion of the magnetic heads and media, physical HDD phenomena that can cause recorded data to become unrecoverable over time. In one embodiment, the ASF is recorded in the normal part of the disk using LBAs and consequently degrades similarly to the user data recorded elsewhere on the HDD.

In one embodiment, the ASF is designed to degrade more quickly than the other data on the removable hard disk cartridge 106. The ASF could be placed on the portions of the disk drive most prone to failure, for example. Error correction could be avoided for the ASF such that any error correction circuits of the HDD would not mask problems with the ASF. Some embodiments could also employ theoretical error models that could override any determination made about the ASF. For example, if the data were known to decay after ten years and the ASF were still showing no errors, remedial measures could be taken anyway because of the theoretical models. In this embodiment, degradation found using the ASF could cause earlier remedial measures, but those measures would be taken after a period of time regardless.

HDDs use data randomizing circuits to randomize data in order to avoid extended sequences of worst-case magnetic patterns. A "de-randomized" worst-case pattern is mathematically determined by operating the data randomizing algorithm in reverse. Alternatively, a known worst-case pattern could be used in some embodiments. The repeated worst-case bit patterns in the ASF will likely degrade more rapidly than normal random data on the disk, thereby predicting when the data portions of the HDD are at risk.

The sensing operation works by the archival management controller 102 reading the ASF while monitoring the bit-error-rate (BER) and error-correction code (ECC) functions in the internal HDD circuits. The sensing operation may also work by reading ordinary data sectors. When the BER and ECC indicators fall outside some predetermined threshold, the magnetic bits on the media have decayed to a point where the integrity of the recorded data is at risk. At-risk data cartridges can be automatically repaired using a "refresh" operation whereby the data is first read by the HDD and then rerecorded in situ in order to refresh the magnetic domains.

This refresh feature can be used in conjunction with a "Media Certification" operation to certify the integrity of the data and with a "Media Refresh" operation which can re-record all of the data in place to refresh the magnetic domains and prolong the archival media life. The Media Certification operation first reads the ASF to determine the degradation state of the media and then reads each data sector to validate the data integrity. The magnetic signal in the ASF could be checked for bit errors or the magnitude of the signal could be noted. Where excessive bit errors or the magnetic signal has excessively degraded, remedial measures can be taken.

If during a media certification operation the archival management controller 102 determines by means of reading and monitoring the ASF that the data is degraded, the archival management controller 102 can then initiate a Media Refresh operation. During Media Refresh, each data sector on the HDD is read, verified and then re-written in its original location to refresh the magnetic bits. If there are data sectors holding data that cannot be read during media certification or media refresh, forward error correction (FEC) can be used to correct the erroneous data bytes before re-recording. After media certification or media refresh, the Last Certified Date field of the ACM is updated with the current date/time code.

The media refresh process can be a background task performed in between accesses to the removable data cartridge 106 or could require halting normal operations until the process completed. In one embodiment, when the data is written the time is noted. Media refresh automatically occurs after a period after that time expires in one embodiment. This may not be possible when the removable data cartridge 106 is not powered, but could be done when powered on the next time. The oldest written data could be refreshed first upon the next power cycle. If errors are noted in the oldest data, a complete refresh could be performed.

Referring next to FIG. 2, the archival management controller 102 contained in the ACMS device 100 has a display 208 and user interface 212 to display cartridge metadata, data aging status and to activate various cartridge management operations. Some embodiments could include a computer that has application software to provide these functions. The ACMS device 100 could be wired or wirelessly coupled to the computer with the application software.

The ACMS device 100 could retain information about the cartridges 106 which have been loaded and their state and managed for use with an internal or external cartridge management database. The internal management database could be stored in a cartridge information memory 216. In some embodiments, the most recent cartridge information is stored in a cartridge information memory 216, but a larger external cartridge database 112 stores more extensive cartridge information. With a portable ACMS device 100, there could be an interface to a fixed cartridge database 112 such as the one shown in FIG. 3. The database 112 is updated with the latest information from one or more ACMS devices 100.

Various connections with the ACMS device 100 are possible. The connection between the ACMS device 100 and the cartridge database 112 could be wireless or wired. In one embodiment, the cartridge information memory 216 stores cartridge information until a wired connection allows loading the cartridge information in the database 112. This embodiment uses a SATA interface 204 to the removable data cartridge 106, but any hard drive or tape protocol could be used in other embodiments, for example, PATA, SAS, and/or SCSI.

The cartridge database 112 contains information about the cartridge ID, contents, archive date, physical location, last ACMS device 100 access, last data refresh, etc. The cartridge database 112 provides the system user with the ability to set management policies and provide alerts when specific cartridges are scheduled to be read with an ACMS device 100. The cartridge database 112 could be run on a general-purpose computer or could be a dedicated system(s).

Figure 4:
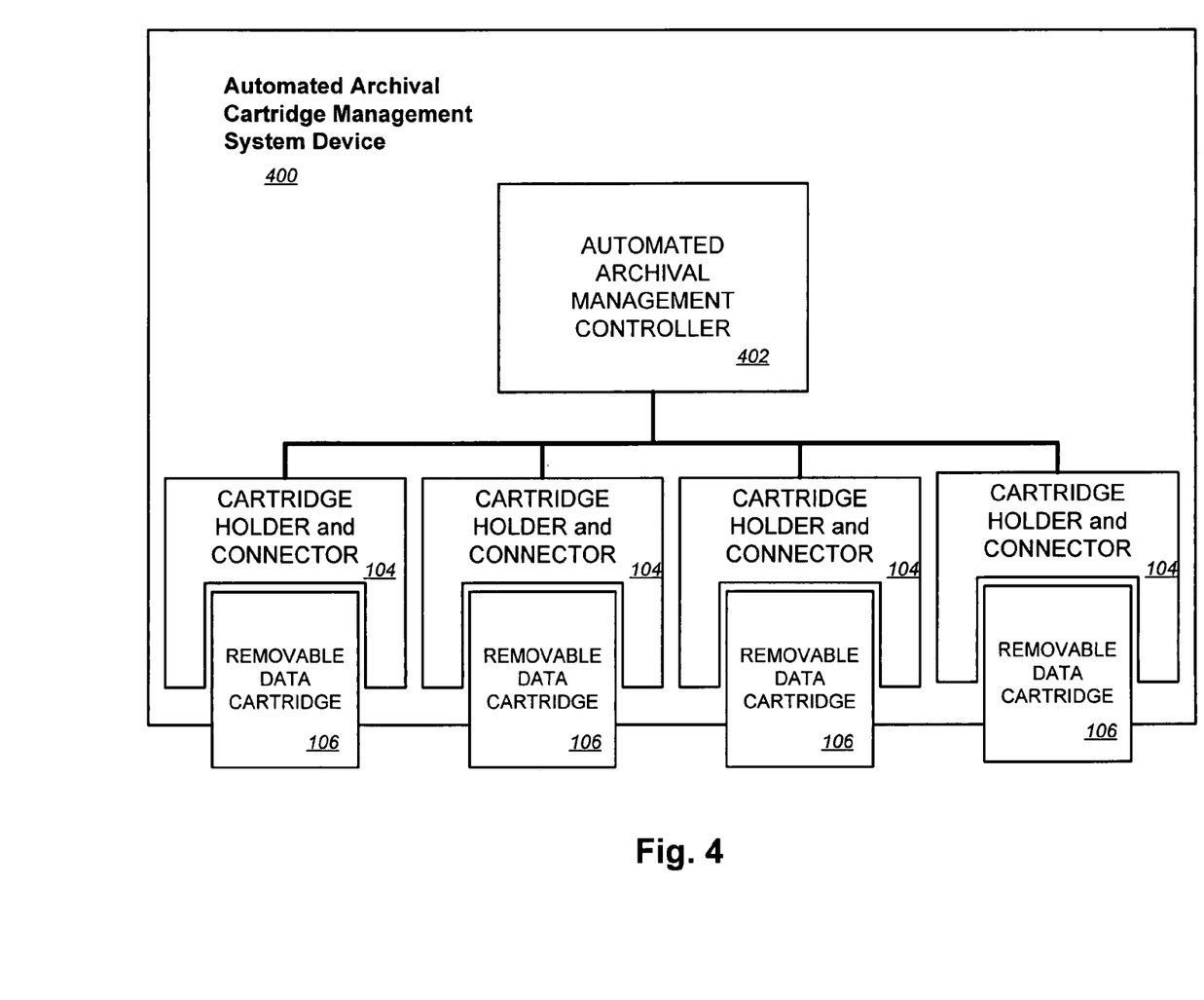
FIG. 4 is a block diagram of an embodiment of an automated ACMS coupled to four removable data cartridges.

One form of the ACMS device 400 shown in FIG. 4 is a design which accommodates the long-term storage of multiple data cartridges 106 (e.g. 4, 10 or 100 cartridges) in individual cartridge holders 104 all connected to the system's electronics and software that implement an automated archival management controller 402. This system is designed with a real-time clock circuit 504 that can keep track of date and time as shown in the block diagram of FIG. 5.

Figure 5:
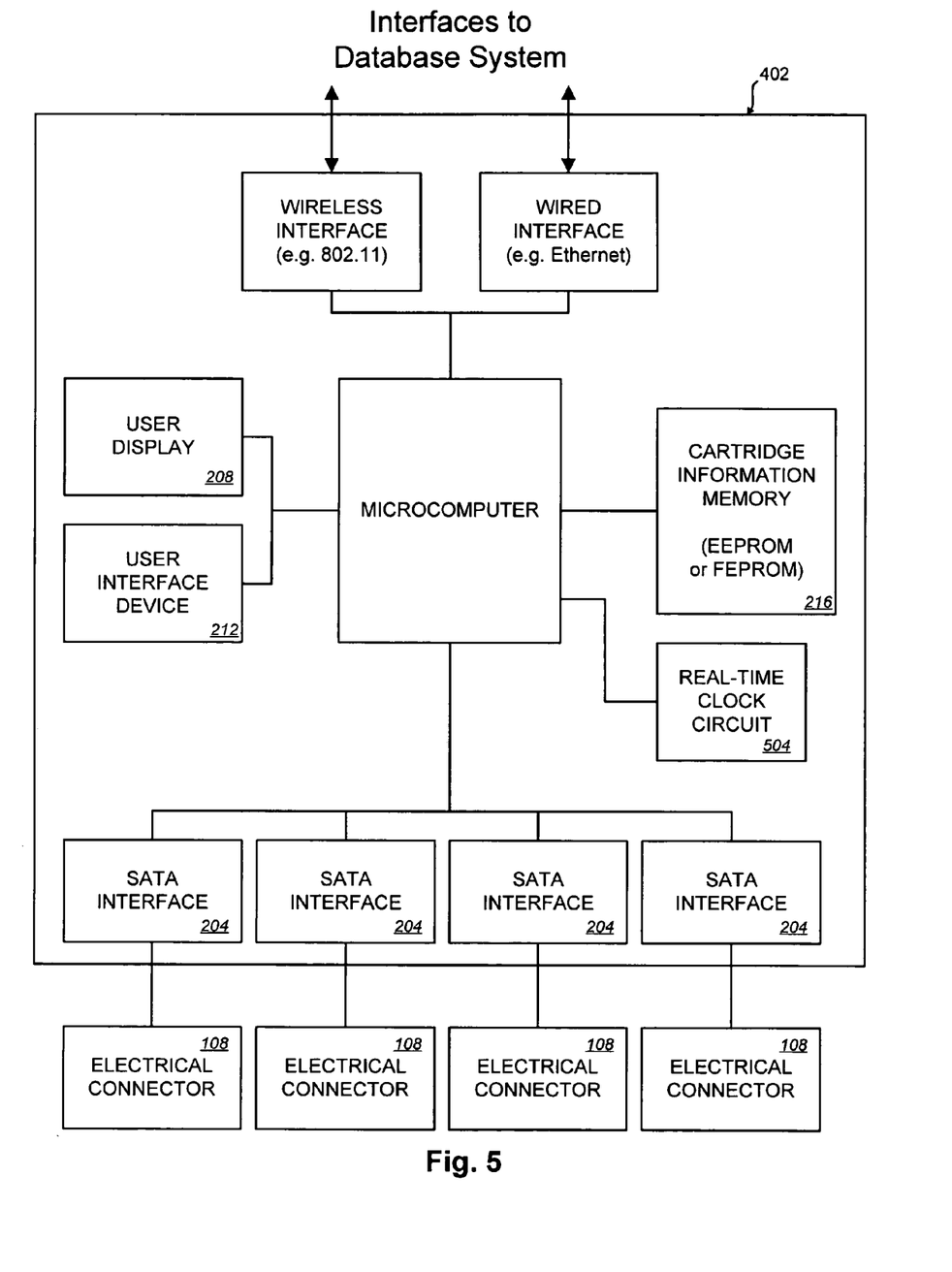
FIG. 5 is a block diagram of an embodiment of an automated archival management controller.

This automated ACMS device 400 also contains an electronic record of cartridges 106 encountered. EEPROM, FEPROM or other non-volatile memory could be used in for the cartridge information memory 216. The record includes the last date/time that the cartridge 106 was accessed. The record could be stored in the cartridge information memory 216 and/or in an external cartridge database 112.

This embodiment of the automated ACMS device 400 is designed to automatically perform ACMS functions (power-up, read the cartridge metadata, read the sense field state and optionally perform the data refresh operation) based on pre-established policies, such as elapsed time since last access. The elapsed time for the elapsed time wait could be a function of the ASF for a particular cartridge such that checks are more frequent as the data ages, for example.

The automated ACMS device 400 provides automated archival storage management without periodically requiring human intervention. The cartridges 106 are just plugged in available holders 104 and conditioning takes place automatically. Such a system can be designed with wired (e.g., Ethernet, FireWire, USB, and/or parallel) or wireless interfaces (e.g. 802.11 WiFi, WiMAX, WiBro, and/or BlueTooth) to connect to a database system 112 located elsewhere in the facility using a LAN or in a different location using a WAN. The depicted embodiment includes four SATA interfaces 204, but a single SATA or other interface could be used with a switching mechanism in other embodiments.

Figure 6:
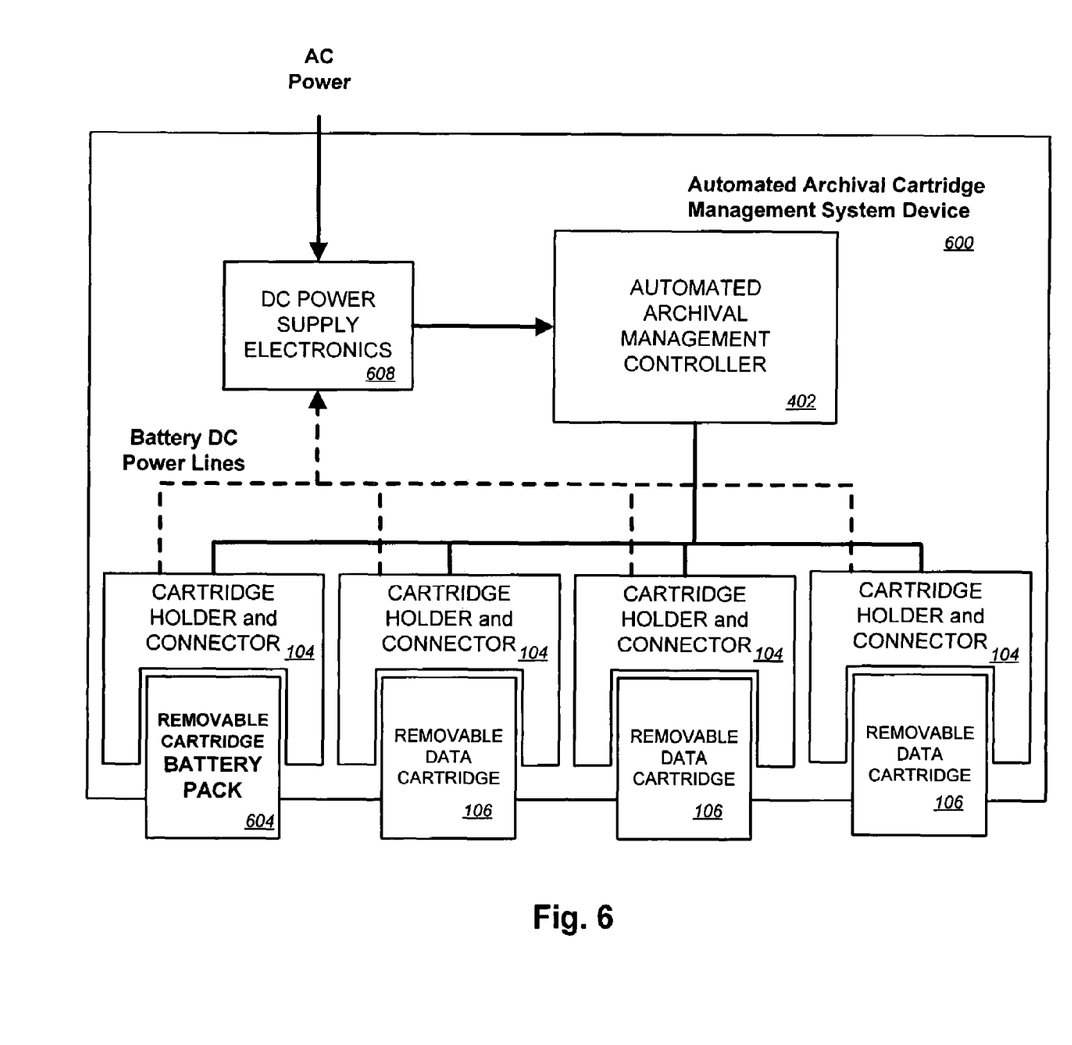
FIG. 6 is a block diagram of an embodiment of an automated ACMS with a cartridge battery pack.

One challenge for use of an automated ACSM device 600 is that many types of storage locations (e.g., a secure vault) may not provide electrical power in one embodiment. FIG. 6 shows an embodiment where one or more of the data cartridges are replaced with a removable cartridge battery pack 604. The battery pack 604 is designed to supply power to the system through the electrical connector and holder 104 as an alternative to a conventional AC power source. The cartridge holder and connector 104 can be designed so that any cartridge slot can be used for a battery pack 604 and more than one battery can be installed at any given time. This is accomplished by including extra power connections in the connector that interface to the power supply circuits in the control electronics as illustrated in FIG. 6. Some embodiments could have an internal battery or use another port for a removable battery. The battery could be used for primary power when no main power or used as an uninterruptible power supply.

The power supply circuits 608 are designed to allow the power source to be either AC power or battery DC power. The power circuits 608 then supply power to the control electronics which supply power to the cartridges 106. The battery pack(s) 604 can include a rechargeable battery that can be periodically recharged. In this embodiment, the user would periodically replace the installed cartridge battery pack with a newly charged one, thus providing continuous power to the ACMS device 600. A status indicator or audible alarm of the battery pack 604 could warn when power was running low.

In one embodiment, the control electronics in the ACMS device 600 minimizes power consumption so that the battery pack 604 may operate for long periods of time. The data cartridges may be energized and monitored at infrequent intervals, such as once per month or once per year. In between these intervals, the control electronics can operate in a sleep mode. The real-time clock circuit 504 can de designed to awaken the microcomputer from sleep mode when the desired management interval has elapsed.

Figure 7:
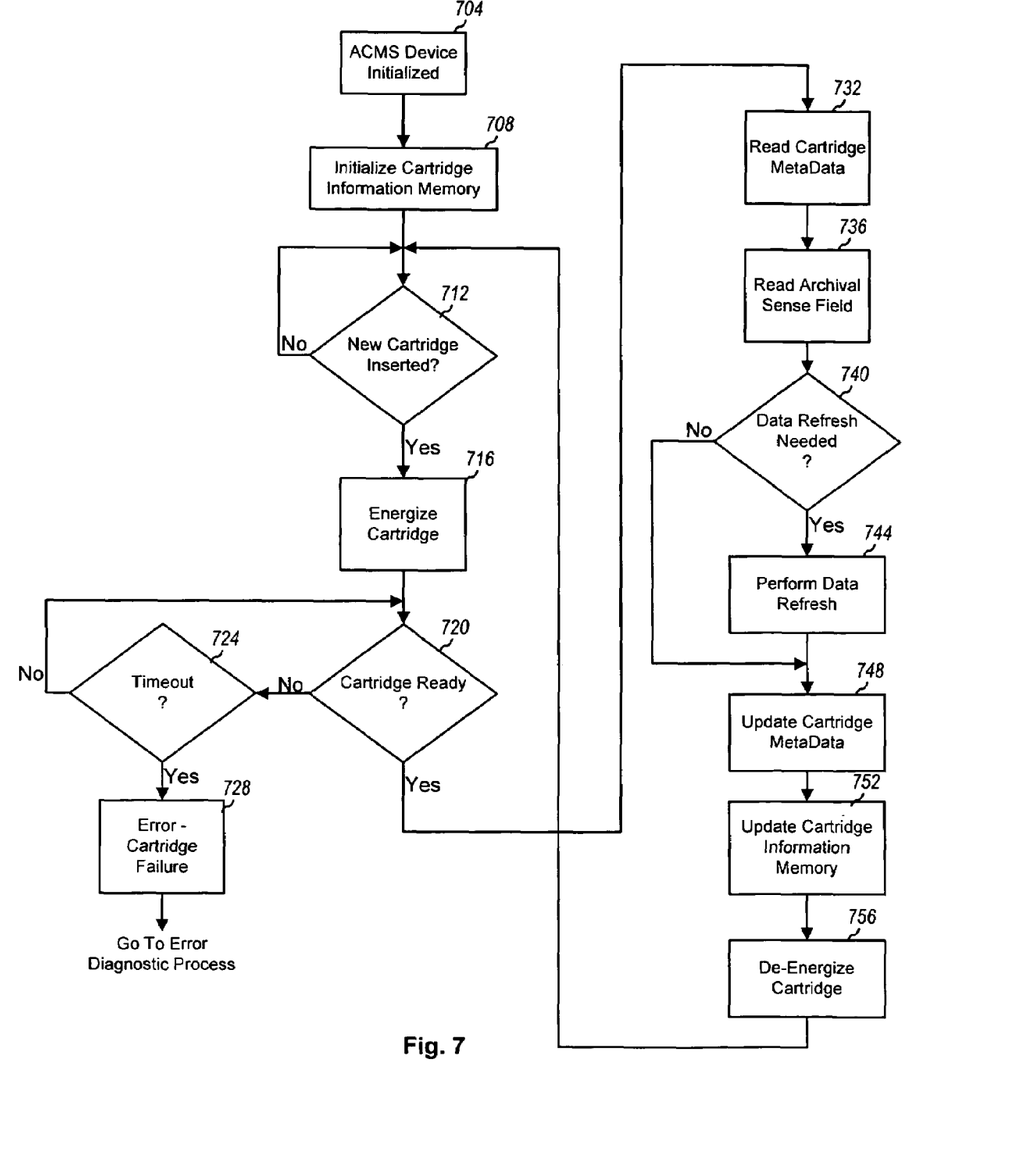
FIG. 7 is a flow chart of an embodiment of a process for manual ACMS operation.

In one embodiment, use of the ACMS device 100 increases the longevity and reliability of the archival media and provides tracking of the state of the cartridges. FIG. 7 shows an embodiment of a flowchart for a handheld or manually operated ACMS device 100. The depicted portion of the process begins in step 704 where the ACMS device 100 is initialized before the cartridge information memory 216 is initialized in step 708. A determination in step 712 holds the process until a cartridge 106 is inserted. The cartridge 106 is energized in step 716.

A determination in step 720 is performed to confirm the cartridge 106 is ready. If not ready, a timeout test is performed in step 724 before looping back to step 720. Should it be determined in step 724 that a timeout has occurred before the cartridge 106 is determined ready in step 720, processing goes to step 728 where an error condition is activated. In one embodiment, the error condition causes diagnostics and/or notification of the condition to the user.

Where the cartridge 106 is determined ready in step 720, processing continues to step 732 where cartridge metadata or ACM is read. The ASF is read in step 736. This ASF and/or ACM could be analyzed to determine or partially determine if the cartridge 106 is due for refresh in step 740. This analysis could use information in the cartridge information memory 216 and/or cartridge database 112. If a refresh is warranted, the refresh is performed in step 744. This refresh process could be for the whole drive or merely a portion.

Where no refresh is warranted in step 740 or where the refresh has already been performed in step 744, processing goes to step 748 where the ACM is updated. The cartridge information memory 216 and/or cartridge database 112 are updated in step 748. Finally, the cartridge is de-energized in step 756 before looping-back to step 712. In some circumstances, the cartridge 106 could be kept active to perform various archival tasks (e.g., backup, restore, read, write, verify, etc.).

Figure 8:
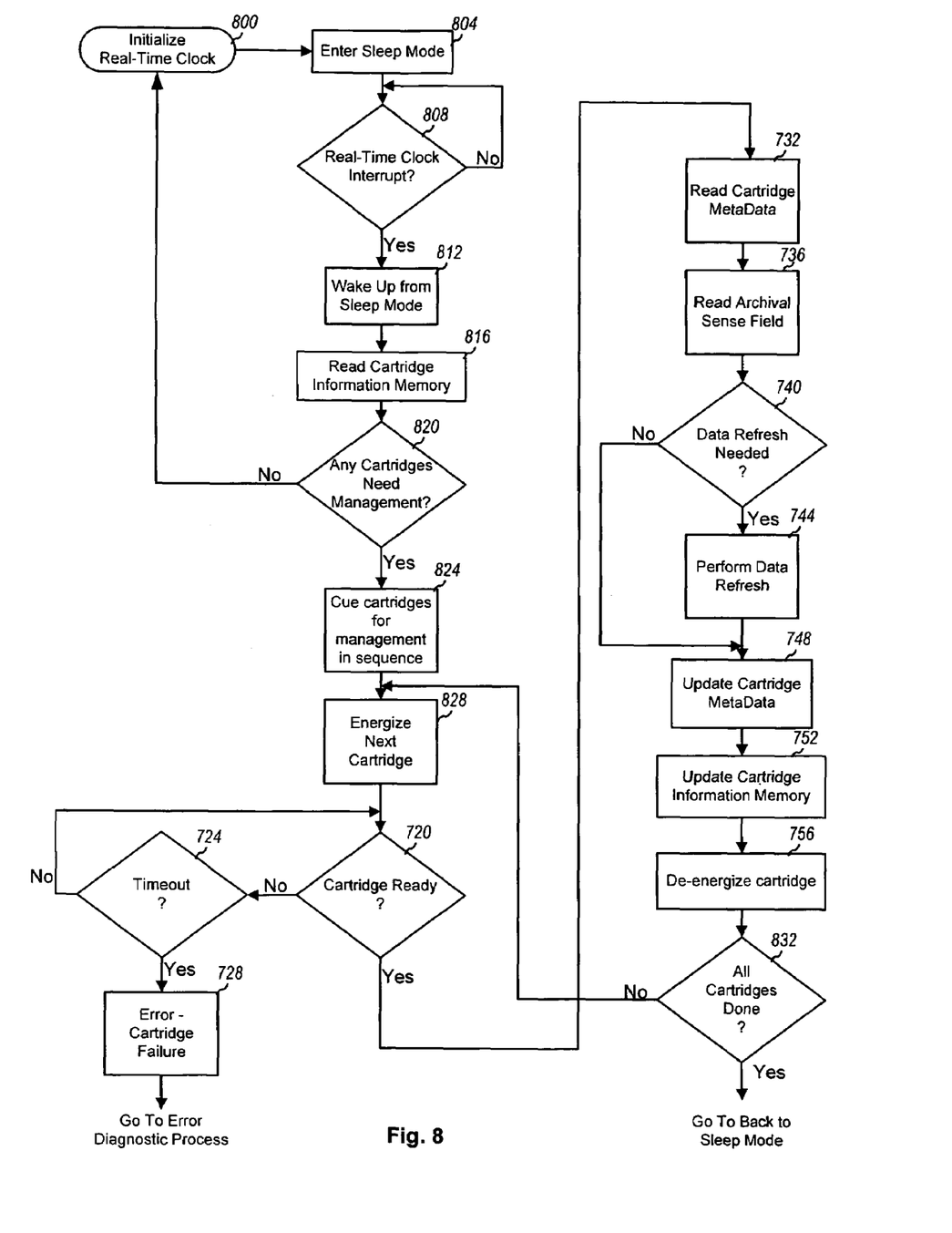
FIG. 8 is a flow chart of an embodiment of a process for automated ACMS operation.

FIG. 8 shows a flowchart of the basic automated ACMS device 100, 400, 600 operation for one embodiment. A user need only plug in the cartridge(s) 604 and monitor for errors displayed on the user display 208. Some embodiments could have an audible alarm, status web pages, or automated electronic messaging when a cartridge 106 fails or is approaching a likely failure. This embodiment could have multiple cartridges 106 coupled to the automated ACMS device 600 at one time.

The depicted portion of the process begins in step 800 where the real-time clock (RTC) 504 is initialized before entering a sleep mode in step 804. The RTC 504 can break out of sleep mode based upon a determination made in step 808. Exit from sleep mode causes the process to advance to step 812 where the ACMS device wakes. The cartridge information memory 216 from each cartridge 106 is read in step 816. Where none are due for management, processing returns to step 800. Those cartridges due for management are queued in step 824.

The next cartridge 106 in the sequence is energized in step 828. Those that do not properly energize are found in steps 828. 720, 724 and 728. Determining if refresh is due and performing the refresh is performed in a manner similar to that done in FIG. 7 before proceeding to step 832 where a determination is made to find if all the cartridges 106 with maintenance due have been processed. Where there are other cartridges 106 due, processing loops back to step 828. This sub-process continues in a loop until all the cartridges 106 due maintenance are processed.

The techniques described herein may be implemented by various means. For example, these techniques may be implemented in hardware, software, or a combination thereof. For a hardware implementation, the processing units within a access point or a access terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

Although the above embodiments describe use of the ACMS device in the refresh determination and refresh process, other embodiments could perform these functions without needing the ACMS device. The firmware of a HDD could perform these functions during idle times. In another embodiment, a circuit within the removable data cartridge 106, but outside the HDD could perform the determination and possible refresh.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

While the principles of the disclosure have been described above in connection with specific apparatuses and methods, it is to be clearly understood that this description is made only by way of example and not as limitation on the scope of the disclosure.

What is claimed is:

1. An archival cartridge management system for conditioning removable data cartridges and normal archival operations, comprising:
   a plurality of cartridge holders configured to be coupled to a plurality of removable data cartridges, wherein:
      the plurality of cartridge holders comprise a cartridge holder,
      the plurality of removable data cartridges comprises a removable data cartridge, and
      the cartridge holder comprises a connector, wherein the connector is configured for coupling with the removable data cartridge;
   a controller coupled to the plurality of connectors, wherein:
      the controller performs archival functions on the plurality of removable data cartridges, the controller reads from the plurality of removable data cartridges to determine if at least some data stored on the removable data cartridge should be refreshed, and the controller refreshes data stored on the removable data cartridge based, at least in part, on the determination.

2. The archival cartridge management system for conditioning removable data cartridges and normal archival operations as recited in claim 1, wherein the archival cartridge management system can monitor the data integrity of the removable data cartridge.

3. The archival cartridge management system for conditioning removable data cartridges and normal archival operations as recited in claim 1, wherein the archival cartridge management system is adapted to use removable data cartridges that include a hard disk drive.

4. The archival cartridge management system for conditioning removable data cartridges and normal archival operations as recited in claim 1, wherein the archival cartridge management system can automatically refresh data stored on the removable data cartridge when the data is determined prone to errors.

5. The archival cartridge management system for conditioning removable data cartridges and normal archival operations as recited in claim 1, wherein the connector electrically communicates between the removable data cartridge and the controller.

6. The archival cartridge management system for conditioning removable data cartridges and normal archival operations as recited in claim 1, wherein the controller automatically performs its functions on the removable data cartridge.

7. The archival cartridge management system for conditioning removable data cartridges and normal archival operations as recited in claim 1, further comprising a battery pack to supply power to the archival cartridge management system.

8. The archival cartridge management system for conditioning removable data cartridges and normal archival operations as recited in claim 1, further comprising a battery pack to supply power to the archival cartridge management system, wherein the battery pack is coupled to the connector.

9. The archival cartridge management system for conditioning removable data cartridges and normal archival operations as recited in claim 1, wherein:

the removable data cartridge comprises a hard disk drive, and the hard disk drive includes an error correction circuit.

10. The archival cartridge management system for conditioning removable data cartridges and normal archival operations as recited in claim 1, further comprising a cartridge database, wherein:

the cartridge database stores information on the plurality of removable data cartridges, and the cartridge database can be used to determine when the removable data cartridge should be refreshed.

11. A method for conditioning removable data cartridges and normal archival operations performed with a cartridge holder, the method comprising steps of:

accepting insertion of the removable data cartridge;

performing archival functions on removable data cartridges;

reading information from removable data cartridges;

automatically determining if at least some data stored on a removable data cartridge should be refreshed, wherein the determining step is performed outside the removable data cartridge; and refreshing data stored on the removable data cartridge based, at least in part, on the automatically determining step, wherein the performing and refreshing steps are performed with the cartridge holder.

12. The method for conditioning removable data cartridges and normal archival operations performed with the cartridge holder as recited in claim 11, wherein the information is stored in an archival sense field.

13. The method for conditioning removable data cartridges and normal archival operations performed with the cartridge holder as recited in claim 11, further comprising a step of maintaining an archival sense field, which is indicative of when data should be refreshed.

14. The method for conditioning removable data cartridges and normal archival operations performed with the cartridge holder as recited in claim 11, wherein the determining step comprises steps of:

reading data from the removable data cartridge; and determining that data is in peril of being lost.

15. The method for conditioning removable data cartridges and normal archival operations performed with the cartridge holder as recited in claim 11, wherein the determining step comprises steps of:

analyzing the information; and determining that data is in peril of being lost.

16. The method for conditioning removable data cartridges and normal archival operations performed with the cartridge holder as recited in claim 11, wherein the removable data cartridge comprises a hard drive.

17. The method for conditioning removable data cartridges and normal archival operations performed with the cartridge holder as recited in claim 11, further comprising a step of performing a media refresh operation that reads and re-writes data to the removable data cartridge.

18. A method for conditioning removable data cartridges and normal archival operations performed with a cartridge holder, the method comprising steps of:

accepting insertion of the removable data cartridge;

writing information to removable data cartridges with the cartridge holder;

reading information from removable data cartridges with the cartridge holder;

automatically determining if at least some data stored on a removable data cartridge is prone to errors, wherein the automatically determining step is performed outside the removable data cartridge; and refreshing data stored on the removable data cartridge with the cartridge holder based, at least in part, on the determining step.

19. The method for conditioning removable data cartridges and normal archival operations performed with the cartridge holder as recited in claim 18, further comprising a step of reading an archival sense field from the removable data cartridge.

20. The method for conditioning removable data cartridges and normal archival operations performed with the cartridge holder as recited in claim 18, further comprising a step of maintaining an archival sense field, which is indicative of when data should be refreshed.

21. The method for conditioning removable data cartridges and normal archival operations performed with the cartridge holder as recited in claim 18, wherein the determining step comprises steps of:
   reading data from the removable data cartridge; and
   determining that data is in peril of being lost.

22. The method for conditioning removable data cartridges and normal archival operations performed with the cartridge holder as recited in claim 18, wherein the determining step comprises steps of:
   analyzing the information; and
   determining that data is in peril of being lost.

23. The method for conditioning removable data cartridges and normal archival operations performed with the cartridge holder as recited in claim 18, wherein the refreshing step is performed autonomously by the removable data cartridge.

24. The method for conditioning removable data cartridges and normal archival operations performed with the cartridge holder as recited in claim 18, wherein the cartridge holder accepts a plurality of removable data cartridges simultaneously.

25. The method for conditioning removable data cartridges and normal archival operations performed with the cartridge holder as recited in claim 18, wherein the removable data cartridge comprises at least one of a hard drive and a solid state drive.

* * * * *